United States Patent [19]

Colineau

[11] Patent Number: 5,894,386

[45] Date of Patent: Apr. 13, 1999

[54] MAGNETIC WRITE/READ HEAD HAVING AT LEAST TWO CONDUCTORS CROSSING A GAP AT DIFFERENT PORTIONS THEREOF SO THAT EACH CONDUCTOR DETERMINES THE WIDTH OF AN INFORMATION ELEMENT

[75] Inventor: Joseph Colineau, Bure-Sur-Yvette, France

[73] Assignee: Thomson-CSF, Paris, France

[21] Appl. No.: 08/927,682

[22] Filed: Sep. 11, 1997

Related U.S. Application Data

[63] Continuation of application No. 08/337,446, Nov. 8, 1994, abandoned.

[30] Foreign Application Priority Data

Nov. 9, 1993 [FR] France ................................. 93 13365

[51] Int. Cl.[6] ........................................................ G11B 5/23
[52] U.S. Cl. ........................................ 360/119; 360/115
[58] Field of Search .................................. 360/110, 115, 360/119, 122, 123, 121

[56] References Cited

U.S. PATENT DOCUMENTS

| | | | |
|---|---|---|---|
| 3,683,407 | 8/1972 | Paul et al. ................................. | 360/123 |
| 5,063,467 | 11/1991 | Colineau et al. ......................... | 360/119 |
| 5,089,923 | 2/1992 | Lehureau ................................. | 360/115 |
| 5,189,579 | 2/1993 | Colineau .................................. | 360/121 |
| 5,227,938 | 7/1993 | Colineau et al. ......................... | 360/114 |
| 5,282,104 | 1/1994 | Coutellier et al. ....................... | 360/115 |

FOREIGN PATENT DOCUMENTS

WO 90/16063  12/1990  WIPO .

*Primary Examiner*—William R. Korzuch
*Attorney, Agent, or Firm*—Oblon, Spivak, McClelland, Maier & Neustadt, P.C.

[57] ABSTRACT

This magnetic head essentially has at least one excitation conductor located below two layers made of magnetic material constituting the magnetic poles of the head and separated by a gap. The positioning of the conductor is such that it forms an angle different from 0° or 90° with respect to the direction of the gap. Different embodiments of the invention are provided for, notably with several conductors to set up a matrix-type control. Application to write/read magnetic heads.

10 Claims, 6 Drawing Sheets

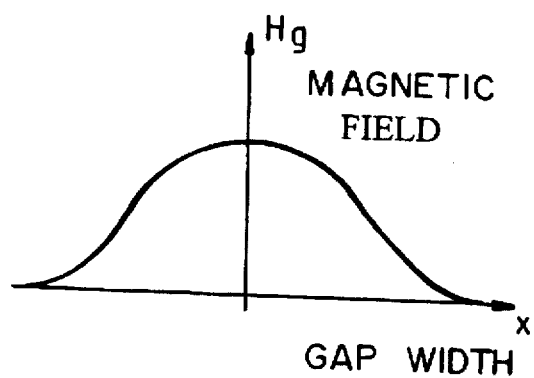
FIG.3
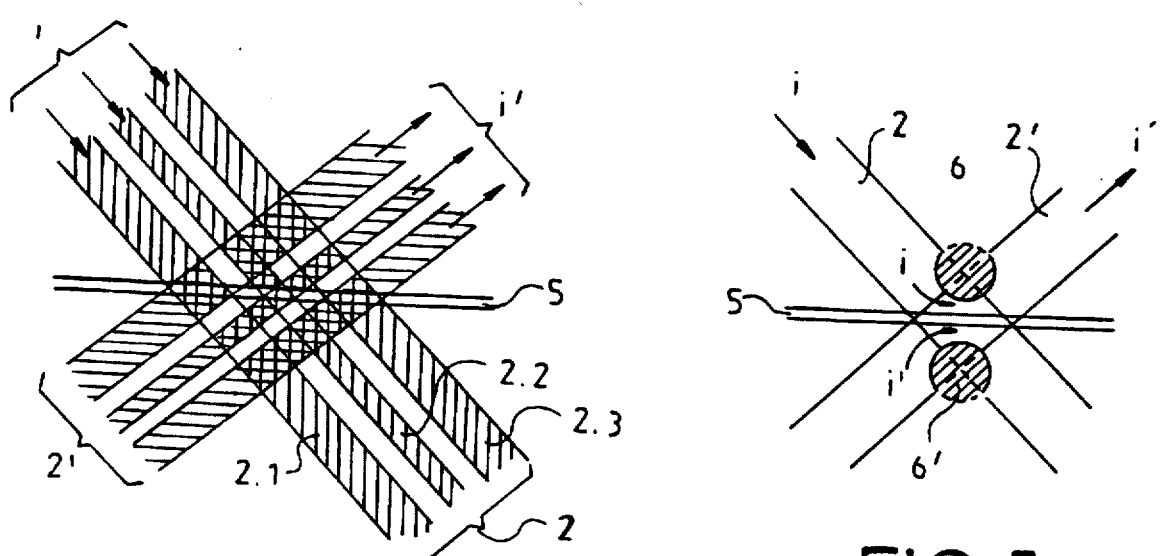
FIG.4
FIG.5

MAGNETIC WRITE/READ HEAD HAVING AT LEAST TWO CONDUCTORS CROSSING A GAP AT DIFFERENT PORTIONS THEREOF SO THAT EACH CONDUCTOR DETERMINES THE WIDTH OF AN INFORMATION ELEMENT

This application is a Continuation of application Ser. No. 08/337,446, filed on Nov. 8, 1994, now abandoned.

BACKGROUND OF THE INVENTION

The invention relates to a magnetic write/read head and more particularly to a magnetic head with integrated winding conductors.

Various planar technologies have been proposed enabling the manufacture, on a surface, of magnetic heads with very large-scale integration.

Besides, multiplexing methods have been described enabling the addressing of a large number of magnetic heads with a small number of connections.

The drawback of these proposed structures with very large-scale integration is that the gaps are not aligned. This calls for the use of memories to take account of the spatial offset between tracks and restricts the implementation of 2D recording codes.

The structure makes it possible, on the contrary, to align the gaps of the magnetic heads and, to a certain extent, to make a continuous (non-discrete) head. This makes the head useful for writing on tapes having various formats.

SUMMARY OF THE INVENTION

The invention therefore relates to a write/read magnetic head comprising at least one first conductor, two layers made of magnetic material located substantially in one and the same plane above the conductor, the two layers being separated magnetically by a gap element, wherein the gap element forms an angle different from zero and different from 90° with the direction of the conductor.

BRIEF DESCRIPTION OF THE DRAWINGS

The various objects and features of the invention shall appear more clearly from the following description and from the appended figures, of which:

FIGS. 2a, 2b and 3 show an exemplary embodiment of a magnetic head with two conductors according to the invention;

FIGS. 4 and 5 show embodiments of conductors of a magnetic head according to the invention;

DETAILED DESCRIPTION OF THE INVENTION

Figure 1A:
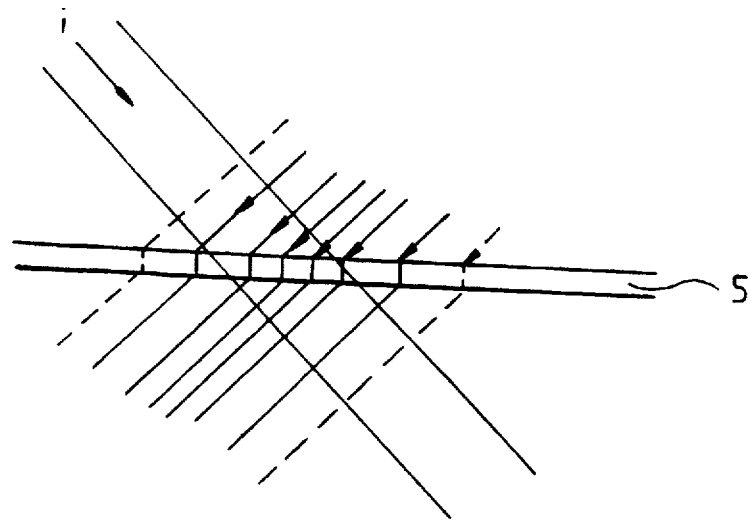
FIGS. 1a and 1b exemplify a simplified embodiment of a magnetic head according to the invention.
Figure 1B:
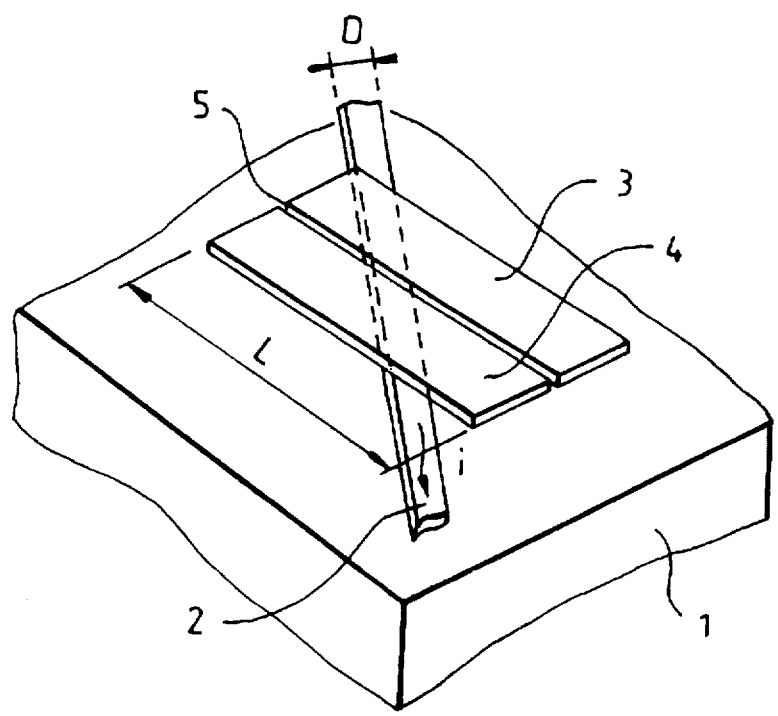

The structure of a magnetic head element made according to the invention is shown in FIGS. 1a and 1b. This structure has, on a substrate 1, a conductor 2 and two layers 3 and 4 made of a material with high magnetic permeability. The two layers 3 and 4 are separated by a gap space 5. The conductor 2 is oriented, with respect to the direction of the gap, by an angle different from 0° and different from 90°.

The length of the gap L is appreciably greater than the width D of the conductor. When the conductor is supplied with a current i, there is an induction of a magnetic field. In the zone of intersection of the conductor 2 and of the gap 5, the magnetic field lines are interrupted by the gap. A magnetic recording medium (not shown) placed above the layers 3 and 4 will provide the magnetic field with an easy path and the magnetic medium could be magnetized as a function of this magnetic field. In the gap 5, the magnetic field lines take the shortest path, namely the path perpendicular to the gap as shown in FIG. 1a. A recording medium will therefore be magnetized along a direction of magnetization that is perpendicular to the gap.

Figure 2A:
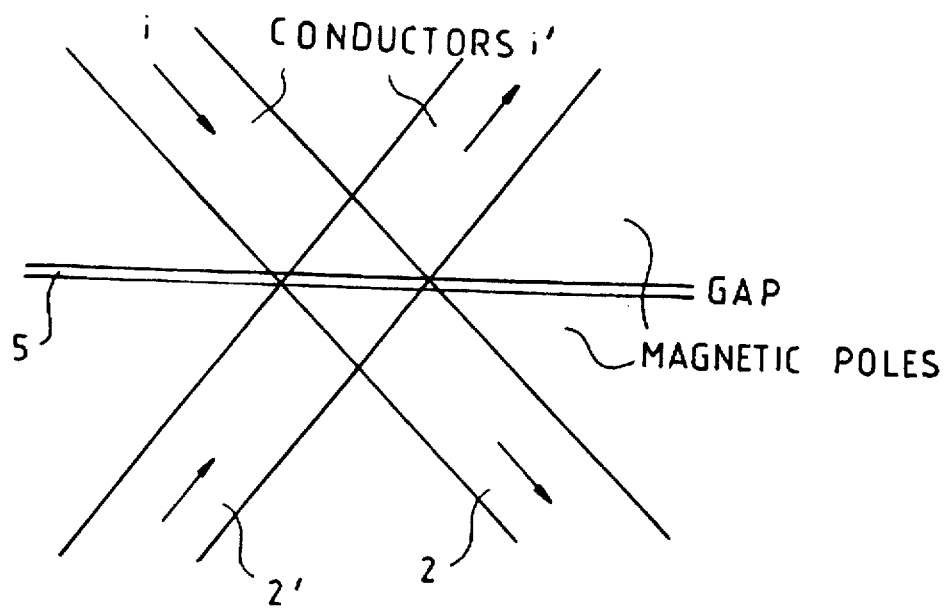
Figure 2B:
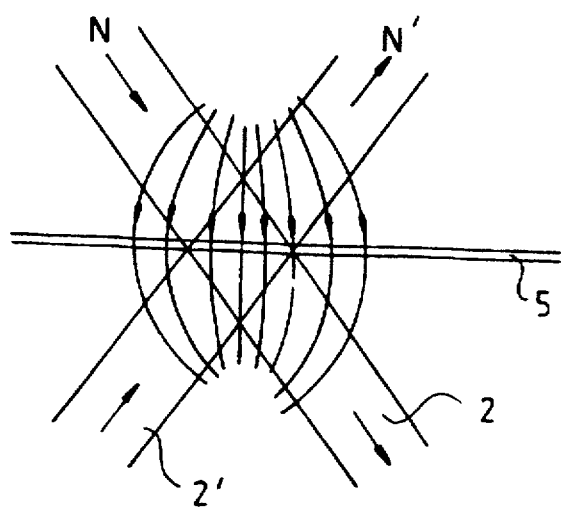

The magnetic head of FIGS. 2a and 2b has two conductors. These figures show only the gap 5 between the two magnetic layers 3 and 4. The two conductors intersect at the gap 5 and are slanted with respect to the direction of the gap.

In a particularly advantageous configuration, the two conductors are orthogonal to each other and are each inclined by 45° with respect to the direction of the gap.

When the conductors are crossed by currents i, i, they generate a magnetic field whose shape is given in FIG. 2b. If the currents are not equal, the distribution of the field is no longer symmetrical but always orthogonal to the direction of the gap.

The field profile created at the gap is given in FIG. 3.

To improve the definition of the width of the tracks written in, several arrangements are possible.

Thus, in FIG. 4, a conductor 2 has a central conductor 2.2 and two side conductors 2.1 and 2.3. If all these conductors are crossed by one and the same current, then the side conductors 2.1 and 2.3 induce a field that is greater than that of the central conductor 2.2. Thus, the profile of the induced field is made more rectangular than the one shown in FIG. 3.

In FIG. 5, the conductors 2 and 2' are etched (etchings 6 and 6') on either side of the gap so that the current in each conductor tends to be parallel to the gap 5.

It is also possible to reduce the conductivity of the conductors locally (in the zones 6 and 6' for example) by methods of implantation.

To make a head designed for use with narrow tracks, it is possible to accept keeping an ill-defined field profile, and the sequential aspect of the writing on the tracks associated with the non-linearity of the tape could be brought into play to define the tracks transversally. It must be noted that the writing method in this case can be likened to that of a standard head working in the longitudinal direction where the trailing edge of the field defines the position of the transition. This mode of writing is particularly suited to reading by means of a linear multitrack head with high track density as described in the French patent application No. 2 656 723 since it is easily possible to correct the physical divergence of the tracks as well as the track-to-track crosstalk which may be relatively high in this mode of operation.

Figure 6:
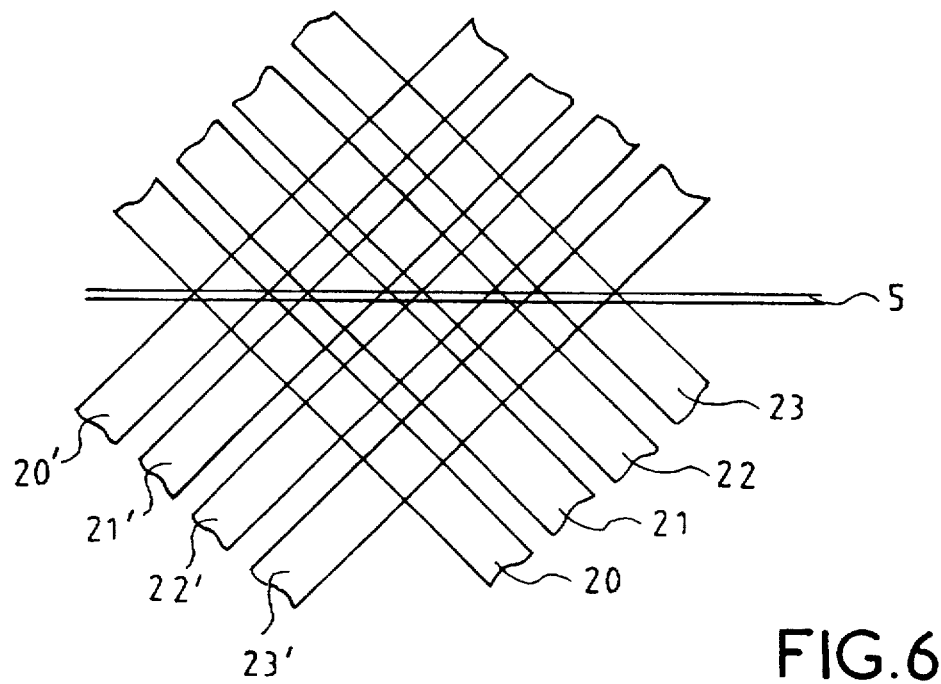
FIGS. 6 to 10 show different embodiments of a magnetic head according to the invention.
Figure 7:
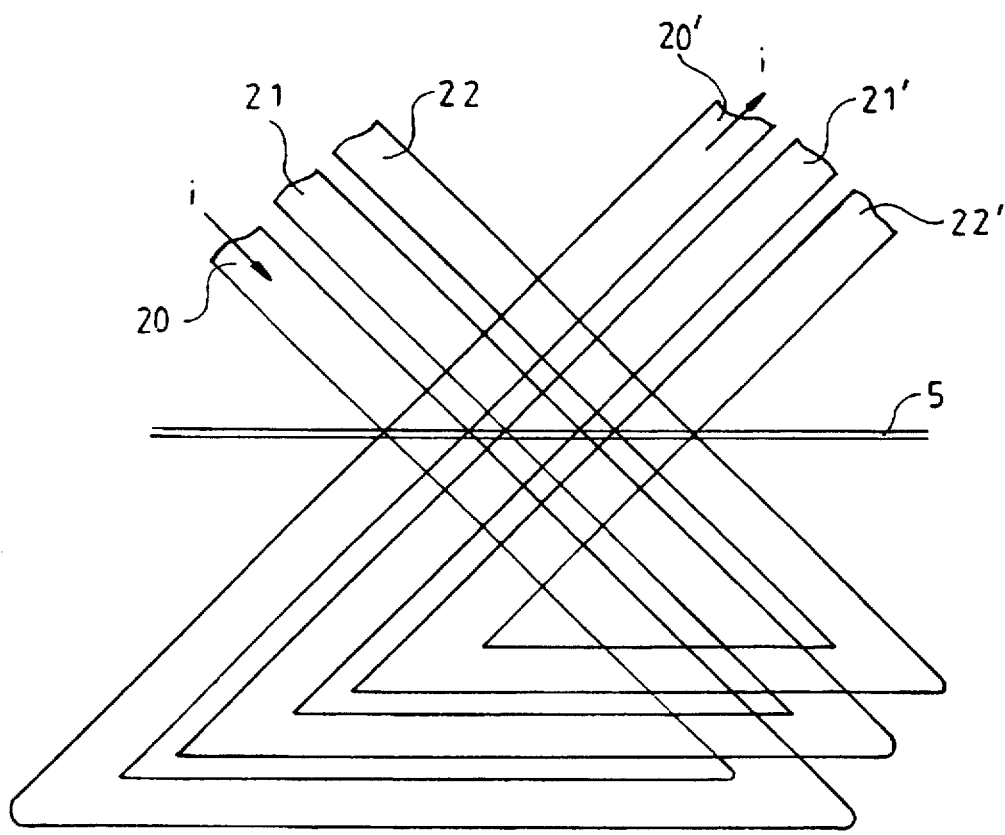

The making of a multitrack head according to the invention can be obtained by the juxtaposition of elements of heads described here above. The simplicity of the structure of the excitation elements can be used to juxtapose it with a very small pitch, limited by the fineness of the etching and by the maximum permissible current density (FIGS. 6 and 7). In FIG. 6, with each conductor such as 20, 23 there is associated a conductor such as 20' 23' and these conductors intersect each another beneath the gap 5. Each intersection of two conductors constitutes the winding of a magnetic head. The combination of the excitations of these conductors enables the control of a magnetic head.

In FIG. 7, each conductor such as 20 is looped to its homologous conductor such as 20'. The two conductors are therefore controlled at the same time.

When the number of elements thus integrated into a multitrack head becomes great, it is advantageous to excite them according to a multiplexed mode as described in the French patent application No. 2 630 853.

In this case, the control is obtained by the superimposition of a low-amplitude current representing the data elements to be written and a current with an amplitude that is sufficient to take the recording media to the switch-over threshold.

Figure 8:
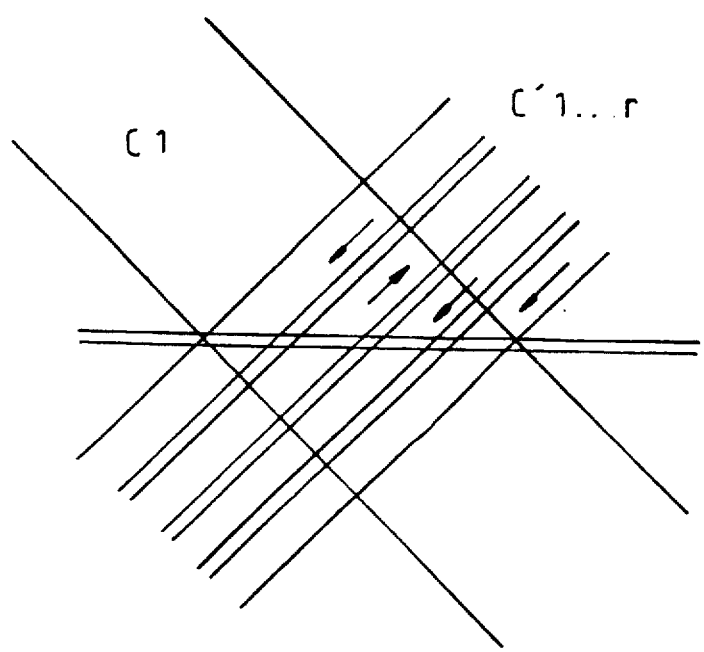

A structure enabling this mode of operation is shown in FIG. 8. C'1 ... n represent, for example, the data conductors and C1 represents a selection conductor. A conductor C1 therefore intersects several conductors C'1 ... n at the gap either because of its width or because of its inclination with respect to the direction of the gap. This structure is repeated n times.

Figure 9:
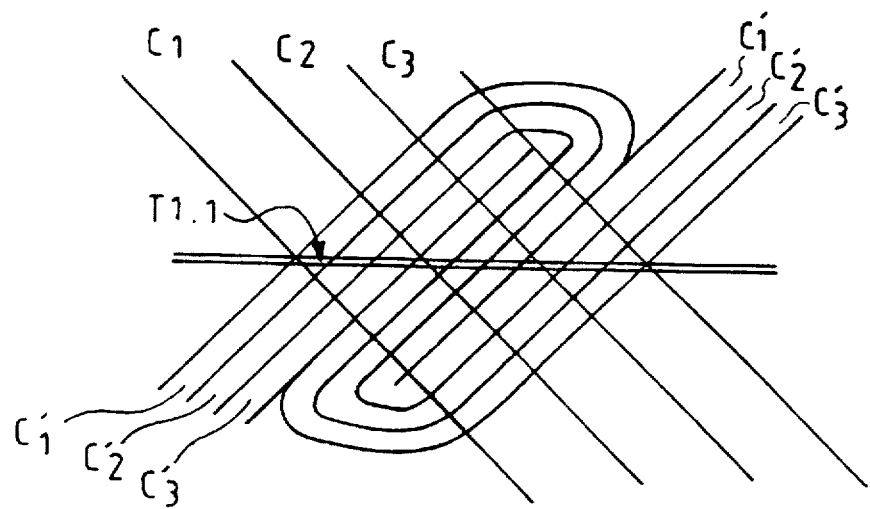

In FIG. 9, each data conductor $C'_1$, $C'_2$, $C'_3$ is looped several times to cross the gap 5 several times. At each crossing of the gap, the set of conductors $C'_1$, $C'_2$, $C'_3$ intersects a selection conductor C1, then C2, then C3, etc. It is thus possible to obtain a controlling of the magnetic heads of the matrix control type. For example, the magnetic head T1.1 is controlled by the controlling of the conductors C1 and $C'_1$.

Figure 10:
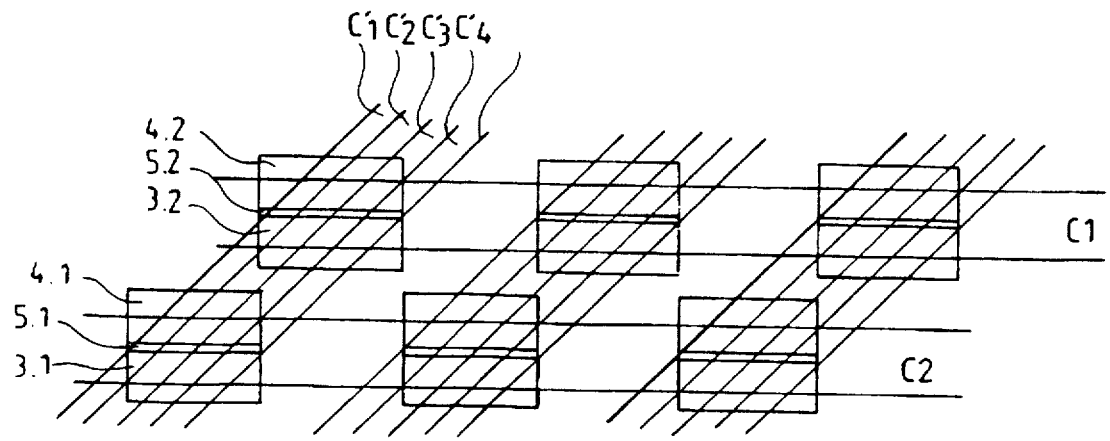

FIG. 10 shows an alternative embodiment in which there are positioned several layers of magnetic material such as 3.1, 4.1 and 3.2, 4.2 separated by gaps 5.1, 5.2, the gaps being aligned along different lines.

Each selection conductor C1, C2 is associated with a gap line such as C1 for the line beginning with the gap 5.1. In the example of FIG. 10, the selection conductors are parallel to the gap lines.

Each data conductor $C'_1$, $C'_2$, $C'_3$, $C'_4$ intersects a gap (5.1, 5.2) of each line of gaps.

The arrangement of FIG. 10 can therefore be controlled in matrix form. For example, the magnetic head T1.1 is controlled by the controlling of the conductors C1 and $C'_1$.

Figure 11:
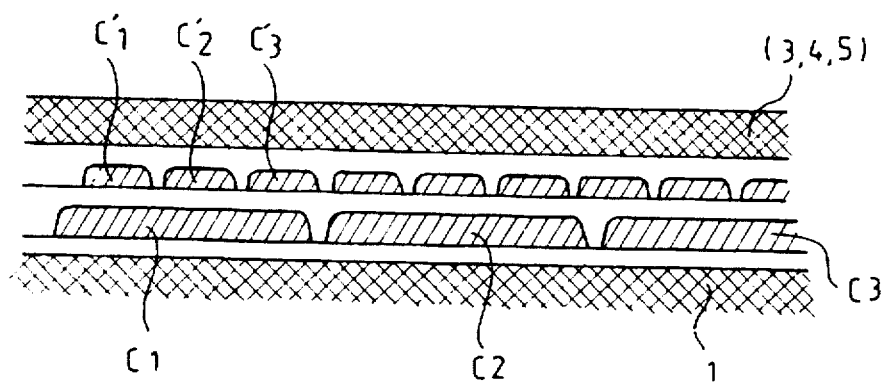
FIG. 11 shows a sectional view of a magnetic head such as the one shown in FIG. 9.

FIG. 11 shows a sectional view of a magnetic head according to the invention. For example, this sectional view represents the magnetic head of FIG. 9.

In the substrate 1, there are the conductors C1 to C3 that are parallel to one another. Above these conductors, there are the conductors $C'_1$, $C'_2$, $C'_3$ which are also parallel to one another. Finally, above the conductors $C'_1$ to $C'_3$ there is the plane of the magnetic poles 3 and 4 separated by the gap 5.

It is more advantageous from the viewpoint of thermal dissipation to use conductors with lower resistance for the data wires.

Variants of the structure of FIG. 8 can be made for example by separating the data wires into several wires supplied in series so as to increase the impedance of the winding, or again by making the data excitation sheet wider than the useful zone of n heads in order to increase the homogeneity of the field produced, or again by arranging the spatial distribution of the current density as indicated further above, again in order to improve the homogeneity.

The thin-film technologies of windings implemented in the standard methods for the manufacture of integrated magnetic heads are appropriate for the making of the windings described herein.

The magnetic structure is formed by a lower part (magnetic substrate or magnetic thin film on non-magnetic substrate for the closing of the flux), this rear part being not strictly indispensable from the viewpoint of its function. The magnetic structure is furthermore formed by an upper part that could be made according to a planar technology as described in the French patent No. 2 605 783 on the substrate provided with its excitation sheets, after planarization of the relief.

What is claimed is:

1. A multitrack write/read magnetic head comprising at least two conductors, and two separate layers made of magnetic material located substantially in one and the same plane entirely above said at least two conductors to form two magnetic poles, the two poles being separated magnetically by a single gap, wherein the at least two conductors cross the gap at an angle between zero and 90°, a length of the gap being substantially greater than the combined width of said at least two conductors, wherein the intersection of said each one of said at least two conductors, with the gap along different portions of the gap determines a width of an information element that is written or read.

2. A magnetic head according to claim 1, wherein a layer of magnetic material is located on the side opposite the two layers of magnetic material with respect to the conductor.

3. A magnetic head according to claim 1, comprising at least a third conductor that intersects one of the at least two conductors substantially at the point of intersection of said one of said at least two conductors with the gap.

4. A magnetic head according to claim 3, wherein each conductor forms an angle of 45° with the gap.

5. A magnetic head according to claim 3, wherein said at least two conductors are parallel to one another.

6. A magnetic head according to claim 3, said at least two conductors and said third conductors have a narrow portion on each side of the gap so as to constitute, at the gap, a conductive zone that is substantially parallel to the gap.

7. A magnetic head according to claim 3, wherein said one of said at least two conductors is looped to said third conductor.

8. A magnetic head according to claim 1, wherein said at least two conductors comprises several parallel conductors.

9. A magnetic head according to claim 1, wherein said head further comprises elementary conductors that are parallel to one another, are located in a plane parallel to the gap, and have a width greater than a width of each of the at least two conductors.

10. A magnetic head according to claim 1, wherein one of said at least two conductors intersects the plane of the gap several times and is at each intersection, secant with the plane of a selection conductor.

* * * * *